US009576328B2

(12) United States Patent
Matsui

(10) Patent No.: US 9,576,328 B2
(45) Date of Patent: Feb. 21, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Haruki Matsui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 473 days.

(21) Appl. No.: 14/139,300

(22) Filed: Dec. 23, 2013

(65) Prior Publication Data

US 2014/0359315 A1    Dec. 4, 2014

(30) Foreign Application Priority Data

May 29, 2013 (JP) ................................. 2013-112924

(51) Int. Cl.
    G01R 21/00 (2006.01)
    G01R 21/06 (2006.01)
    G06Q 50/06 (2012.01)
    G06Q 10/06 (2012.01)

(52) U.S. Cl.
    CPC ............. *G06Q 50/06* (2013.01); *G06Q 10/06* (2013.01)

(58) Field of Classification Search
    CPC ....... G05B 15/02; G05B 11/01; G05B 19/042; G05B 2219/2639; G05B 23/0229; G05B 23/0254; G05B 23/0294; G06Q 50/06; G06Q 10/06; G06Q 10/00; G06Q 50/16; H04L 41/0833; H04L 47/783; H04L 47/821
    See application file for complete search history.

(56) References Cited

U.S. PATENT DOCUMENTS

2011/0145607 A1    6/2011  Watakabe et al.
2012/0065792 A1*   3/2012  Yonezawa ................. H02J 3/14
                                                        700/291

FOREIGN PATENT DOCUMENTS

JP    2009252056 A    10/2009
JP    2010186224 A    8/2010
JP    2011-123762 A   6/2011
JP    2012-138123 A   7/2012

OTHER PUBLICATIONS

Communication dated Jul. 19, 2016, from the Japanese Patent Office in counterpart application No. 2013-112924.

* cited by examiner

*Primary Examiner* — Roy Y Yi
(74) *Attorney, Agent, or Firm* — Sughrue Mion, PLLC

(57) ABSTRACT

An information processing apparatus includes a configuration information acquiring unit, an operation information acquiring unit, an estimating unit, and a first power calculator. The configuration information acquiring unit acquires configuration information representing a configuration of a device. The operation information acquiring unit acquires operation information representing an operation state of the device. The estimating unit estimates a first device maximum power and a first device minimum power in accordance with the configuration information, the first device maximum power being a maximum power consumed by the device, the first device minimum power being a minimum power consumed by the device. The first power calculator calculates a first power consumed by the device, in accordance with the first device maximum power, the first device minimum power, and the operation information.

11 Claims, 11 Drawing Sheets

FIG. 2

| ATTRIBUTE | EXPLANATION |
|---|---|
| CPU | NAME OF CPU |
| PC TYPE | WHAT TYPE OF PC? |
| OS | WHAT TYPE OF OS? |
| YEAR | YEAR OF PURCHASE |
| MEMORY | CAPACITY (GB) |
| INCH | THE NUMBER OF INCHES (IN THE CASE OF NOTEBOOK PC) |
| RAID | WHETHER OR NOT DEVICE HAS RAID CONFIGURATION |
| ... | ... |

FIG. 3

| ID | MAKER | BRAND | NUMBER | CLOCK SPEED | IDLE POWER | MAX POWER |
|---|---|---|---|---|---|---|
| Intel(R) Core(TM) i3-2377M CPU @ 1.50 GHz | Intel | Intel Core | i3-2377M | 1500 | 3.4 | 17 |
| Intel(R) Core(TM) i3-2370M CPU @ 2.40 GHz | Intel | Intel Core | i3-2370M | 2400 | 7 | 35 |
| Intel(R) Core(TM) i7-3612QE CPU @ 3.10 GHz | Intel | Intel Core | i7-3612QE | 3100 | 7 | 35 |
| Intel(R) Core(TM) i7-3610QM CPU @ 3.30 GHz | Intel | Intel Core | i7-3610QM | 3300 | 9 | 45 |
| ... | ... | ... | ... | ... | ... | ... |

FIG. 4

| POWER MODEL | MODEL CONDITION | | Pc-Base | CPU IDLE/MAX |
|---|---|---|---|---|
| | EXAMPLE OF SETTING CONDITION | EXAMPLE OF SETTING | | |
| Note.Low | (PcType=[Note])&(Inch<=14) | 14 INCHES OR LESS | 10 | 5/45 |
| Note.Nomal | PcType=[Note] | TYPE OF DEVICE IS NOTE, AND THE OTHER CASES | 15 | 5/32 |
| Desktop.Low | (((OS=[Windows7])II(Year>=[2010]))&&(Memory<=[8]))II (CpuMaxPower<=65) | "OS IS Windows 7, OR TYPE OF DEVICE IS DESKTOP PC MADE AFTER 2010, AND THE CAPACITY OF MEMORY IS 8 GB OR LESS" OR "MAXIMUM POWER OF CPU IS 65 W OR LESS" | 40 | 10/50 |
| Desktop.High | (Year>2006]) II(Memory<=[8]) | "YEAR OF PURCHASE IS BEFORE 2006" OR "THE CAPACITY OF MEMORY IS 8 GB OR MORE" | 100 | 10/100 |
| Desktop.Nomal | | TYPE OF DEVICE IS DESKTOP, AND THE OTHER CASES | 60 | 10/65 |
| Server.High | (Memory>20)&&(RAID=[true]) | | 200 | 10/120 |
| ... | | | | |

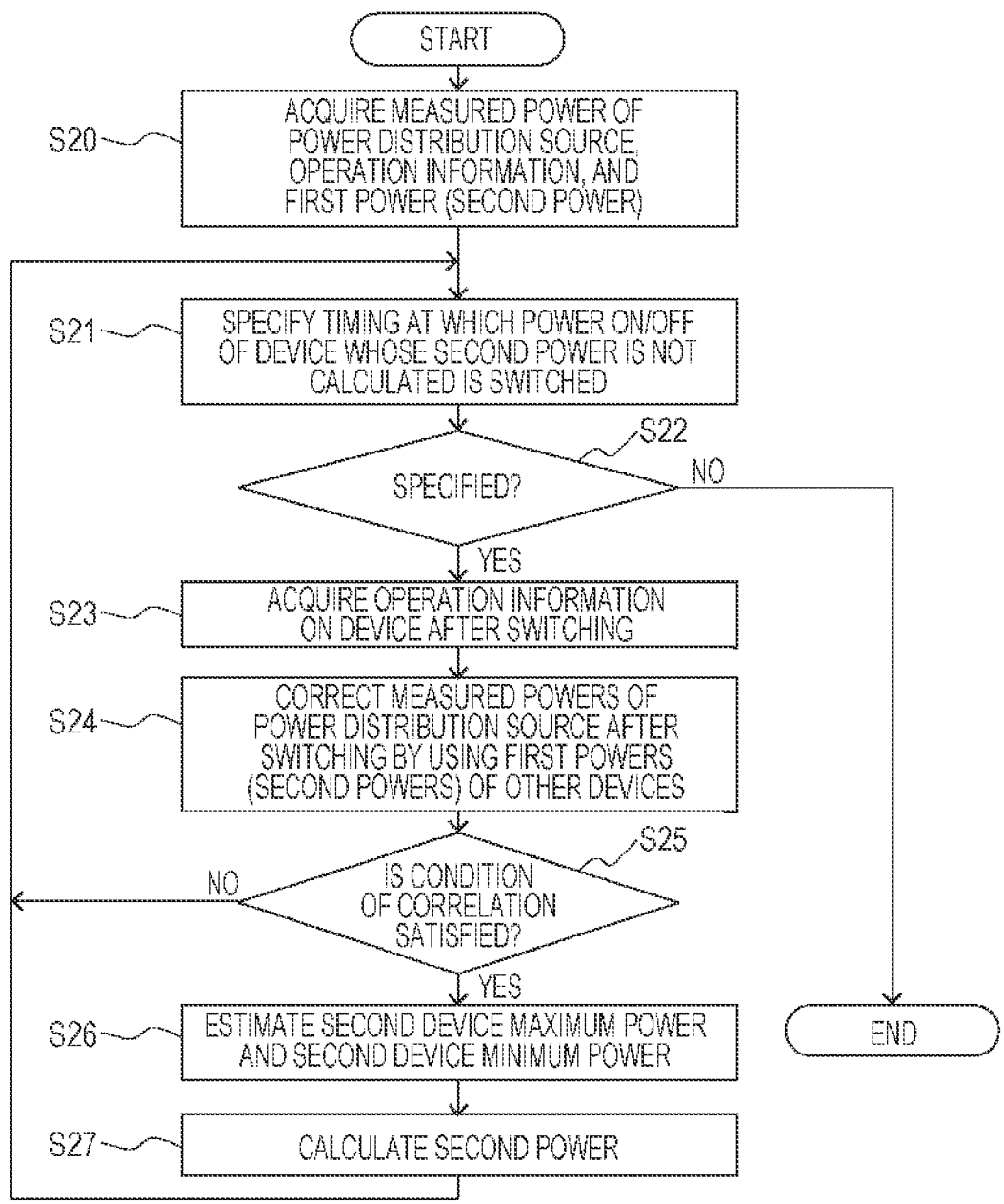

FIG. 10

| DATE AND TIME | MEASURED POWER OF POWER DISTRIBUTION SOURCE | DEVICE A | | | | DEVICE B | | | | DEVICE C | | | | DEVICE D | | | |
|---|---|---|---|---|---|---|---|---|---|---|---|---|---|---|---|---|---|
| | | POWER ON/OFF | OPERATION RATE | FIRST POWER | SECOND POWER | POWER ON/OFF | OPERATION RATE | FIRST POWER | SECOND POWER | POWER ON/OFF | OPERATION RATE | FIRST POWER | SECOND POWER | POWER ON/OFF | OPERATION RATE | FIRST POWER | SECOND POWER |
| 1/25/2011 9:30:00 | 44900 | OFF | 0% | 0 W | UNKNOWN | OFF | 0% | 0 W | 0 W | ON | 0% | 50 W | UNKNOWN | ON | 0% | 50 W | 40 W |
| 1/25/2011 9:30:10 | 44900 | OFF | 0% | 0 W | UNKNOWN | OFF | 0% | 0 W | 0 W | ON | 0% | 50 W | UNKNOWN | ON | 0% | 50 W | 40 W |
| 1/25/2011 9:30:20 | 44900 | OFF | 0% | 0 W | UNKNOWN | OFF | 0% | 0 W | 0 W | ON | 0% | 50 W | UNKNOWN | ON | 0% | 50 W | 40 W |
| 1/25/2011 9:30:30 | 45000 | ON | 100% | 120 W | UNKNOWN | OFF | 0% | 0 W | 0 W | ON | 0% | 50 W | UNKNOWN | ON | 0% | 50 W | 40 W |
| 1/25/2011 9:30:40 | 44990 | ON | 75% | 100 W | UNKNOWN | OFF | 0% | 0 W | 0 W | ON | 20% | 65 W | UNKNOWN | ON | 20% | 65 W | 50 W |
| 1/25/2011 9:30:50 | 44990 | ON | 100% | 120 W | UNKNOWN | OFF | 0% | 0 W | 0 W | ON | 0% | 50 W | UNKNOWN | ON | 0% | 50 W | 40 W |
| 1/25/2011 9:31:00 | 44970 | ON | 0% | 60 W | UNKNOWN | OFF | 0% | 0 W | 0 W | ON | 0% | 50 W | UNKNOWN | ON | 0% | 50 W | 40 W |
| 1/25/2011 9:31:10 | 44970 | ON | 0% | 60 W | UNKNOWN | OFF | 0% | 0 W | 0 W | ON | 0% | 50 W | UNKNOWN | ON | 20% | 65 W | 50 W |
| 1/25/2011 9:31:20 | 44970 | ON | 0% | 60 W | UNKNOWN | OFF | 0% | 0 W | 0 W | ON | 0% | 50 W | UNKNOWN | ON | 0% | 50 W | 40 W |
| 1/25/2011 9:31:30 | 44970 | ON | 0% | 60 W | UNKNOWN | OFF | 0% | 0 W | 0 W | ON | 0% | 50 W | UNKNOWN | ON | 0% | 50 W | 40 W |
| 1/25/2011 9:31:40 | 45100 | ON | 0% | 60 W | UNKNOWN | ON | 100% | 100 W | 130 W | ON | 0% | 50 W | UNKNOWN | ON | 0% | 50 W | 40 W |
| ... | ... | ... | ... | ... | ... | ... | ... | ... | ... | ... | ... | ... | ... | ... | ... | ... | ... |

FIG. 11

| TIME | OPERATION RATE OF DEVICE A | OPERATION RATE OF DEVICE B | OPERATION RATE OF DEVICE C | MEASURED POWER OF POWER DISTRIBUTION SOURCE |
|---|---|---|---|---|
| 13:30 | 100% | 100% | 100% | 330 |
| 13:31 | 50% | 100% | 100% | 280 |
| 18:40 | 0% (ON-STATE) | 100% | 100% | 230 |
| 18:41 | 0% (OFF-STATE) | 100% | 100% | 220 |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-112924 filed May 29, 2013.

BACKGROUND (i) Technical Field

The present invention relates to an information processing apparatus, an information processing method, and a non-transitory computer readable medium.

(ii) Related Art

Technologies for calculating the power consumption of devices are available.

SUMMARY

According to an aspect of the invention, there is provided an information processing apparatus including a configuration information acquiring unit, an operation information acquiring unit, an estimating unit, and a first power calculator. The configuration information acquiring unit acquires configuration information representing a configuration of a device. The operation information acquiring unit acquires operation information representing an operation state of the device. The estimating unit estimates a first device maximum power and a first device minimum power in accordance with the configuration information, the first device maximum power being a maximum power consumed by the device, the first device minimum power being a minimum power consumed by the device. The first power calculator calculates a first power consumed by the device, in accordance with the first device maximum power, the first device minimum power, and the operation information.

BRIEF DESCRIPTION OF THE DRAWINGS

Exemplary embodiments of the present invention will be described in detail based on the following figures, wherein:

FIG. 2 is a diagram illustrating an example of configuration information on a device;

FIG. 3 is a diagram illustrating an example of a CPU database;

FIG. 4 is a diagram illustrating an example of a power model definition file;

FIG. 9 is a flowchart illustrating an example of an operation performed by the information processing apparatus according to the second exemplary embodiment;

FIG. 10 is a table illustrating an example of operation states and so forth of devices; and FIG. 11 is a table illustrating another example of operation states and so forth of devices.

DETAILED DESCRIPTION

First Exemplary Embodiment

Figure 1:
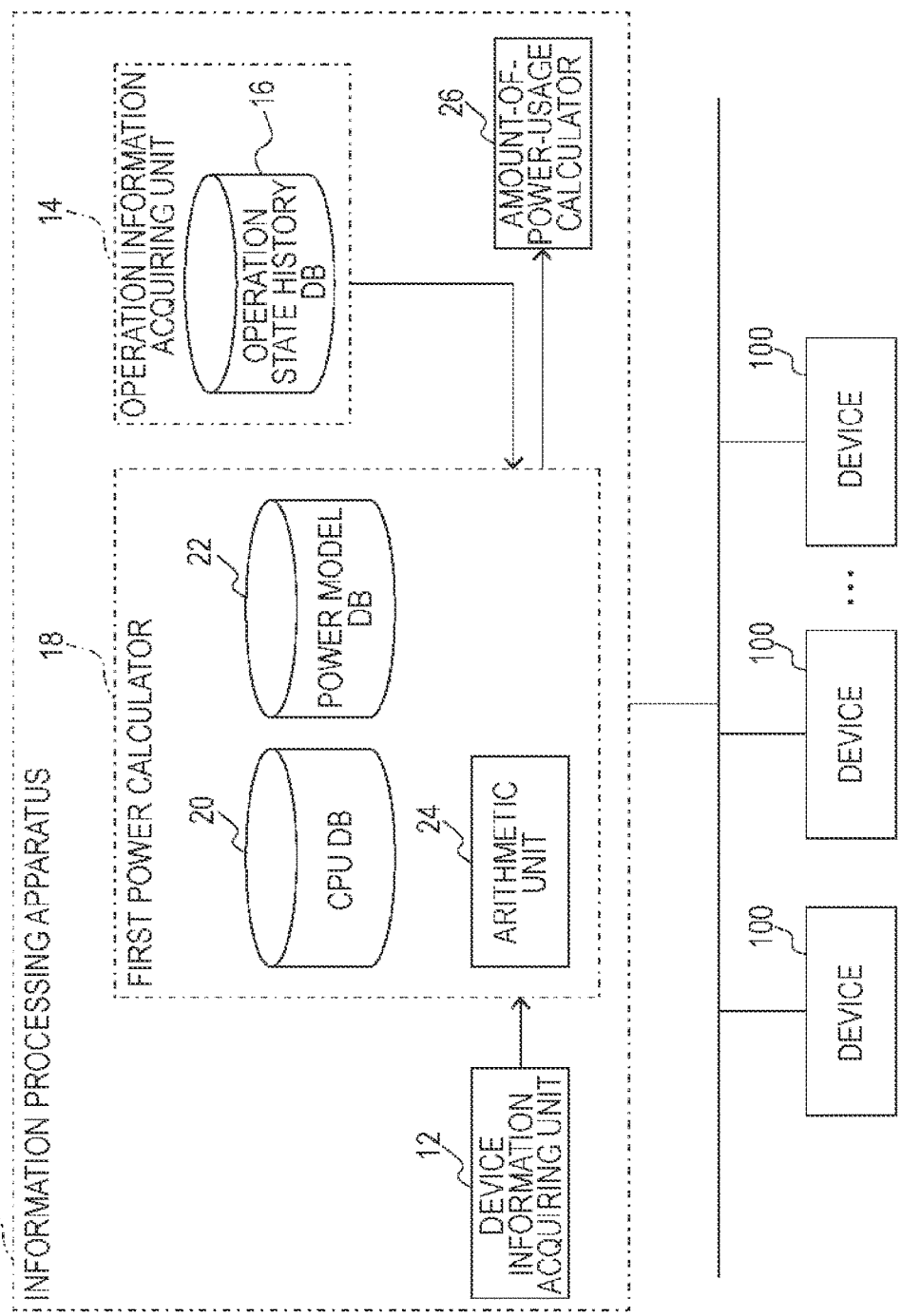
FIG. 1 is a block diagram illustrating an example of an information processing apparatus according to a first exemplary embodiment.

An information processing apparatus according to a first exemplary embodiment will be described with reference to FIG. 1. An information processing apparatus 10 according to the first exemplary embodiment includes a device information acquiring unit 12, an operation information acquiring unit 14, a first power calculator 18, and an amount-of-power-usage calculator 26. For example, plural devices 100 are located in a building of an office or the like, and the information processing apparatus 10 calculates the power consumptions of the individual devices 100. The information processing apparatus 10 and the individual devices 100 may be connected to each other directly or via a communication channel such as a network.

The device information acquiring unit 12 acquires configuration information representing the configuration of a device 100. For example, the device information acquiring unit 12 may acquire configuration information on a device 100 from the device 100, or may acquire configuration information on the device 100 from a database or the like. Also, the device information acquiring unit 12 may acquire the name of the device 100. Hereinafter, a description will be given of a case where the device 100 is a personal computer (PC). Note that an exemplary embodiment of the present invention is not limited to this example, and the device 100 may be an image forming device such as a copier, or an electric device such as an air conditioner or a lighting device. In a case where the device 100 is a PC, the configuration information includes information on a central processing unit (CPU) of the PC and information on the elements of the PC other than the CPU. For example, the configuration information includes information on the CPU included in the device 100 (the type and name of the CPU), information on an operating system (OS) mounted in the device 100 (the type and name of the OS), information representing the type of the PC (notebook PC, desktop PC, or tablet PC), information representing release data such as a release date, information on a storage device included in the device 100, such as a memory or a hard disk drive (HDD) (storage capacity, etc.), and information on a display included in the device 100 (the type and size of the display). FIG. 2 illustrates an example of configuration information. The configuration information includes, for example, information representing the name of the CPU, the type of the PC, the type of the OS, the year of purchase of the PC, the capacity of the memory, the size of the display (the number of inches), and information indicating whether or not the PC has a RAID configuration. The configuration information illustrated in FIG. 2 is an example. Part of the information illustrated in FIG. 2 may be included in the configuration information, and other information may be included in the configuration information.

The operation information acquiring unit 14 includes an operation state history database (DB) 16, acquires operation information representing the operation states of the individual devices 100 from the devices 100, and stores the operation information in the operation state history DB 16. For example, the operation information acquiring unit 14 acquires operation information on the individual devices 100 at individual times from the individual devices 100, and stores the operation information in the operation state history DB 16. The operation information represents, for example, an ON/OFF state of the power of each device 100 and the operation rate of the device 100. In a case where the device 100 is a PC, a usage rate of the CPU corresponds to the operation rate, for example.

The first power calculator 18 includes a database of a group of parts represented by the operation rate of the entire device 100 (in a case where the device 100 is a PC, a CPU database (DB) 20), a power model database (DB) 22, and an arithmetic unit 24, and calculates the power consumptions of the devices 100 in individual operation states on the basis of the configuration information and operation information on the devices 100.

The CPU DB 20 stores the type of CPU, a CPU minimum power (CPU idle power), and a CPU maximum power in association with one another. The information representing the correspondence among them is created in advance and is stored in the CPU DB 20. The CPU minimum power is an instantaneous power that is consumed by the CPU when the usage rate of the CPU is minimum (0%) and the CPU is in an idle state. That is, the CPU minimum power corresponds to the power consumption of the CPU in an idle state. Here, an idle state is a state where the device 100 (PC) is in a standby state, and is a state where the CPU is not performing any processing. The CPU maximum power is an instantaneous power that is consumed by the CPU when the usage rate of the CPU is maximum (100%). FIG. 3 illustrates an example of a CPU DB. In the CPU DB, the names (IDs) of individual CPUs, CPU minimum powers (idle powers), and CPU maximum powers (max powers) are associated with one another. In addition, information representing the manufacturers of the CPUs, the brand names of the CPUs, the numbers of the CPUs, and the clock speeds of the CPUs may be stored in the CPU DB. The information stored in the CPU DB may be, for example, information on the specifications of CPUs provided from the manufactures of the CPUs.

The power model DB 22 stores a power model definition file. The power model definition file represents the correspondence between a model condition indicating the configuration of a device and an instantaneous base power that is expected to be consumed by the elements of the device other than the CPU of the device satisfying the model condition. The model condition is defined by a combination of elements of the device. For example, the model condition is defined by a combination of at least one of information regarding an OS mounted in the device 100 (the type and name of the OS), information representing the type of the device 100 (PC), information representing release data, information regarding a storage device included in the device 100, and information regarding a display included in the device 100. The base power corresponds to the power consumed by the device 100 without depending on the usage rate of the CPU. The power model definition file is created in advance and is stored in the power model DB 22. FIG. 4 illustrates an example of the power model definition file. The power model definition file represents the correspondence among the names of power models, model conditions, base powers (PC-base), CPU minimum powers (CPU idle), and CPU maximum powers (CPU max). For example, in the case of a power model "Note.Low", the model condition is "a notebook PC including a display of 14 inches or less", the base power (predicted value) of the device (notebook PC) satisfying the model condition is predicted to be 10 (W), the CPU minimum power is predicted to be 5 (W), and the CPU maximum power is predicted to be 45 (W). In the case of a power model "Desktop.High", the model condition is "a desktop PC whose date of purchase is before 2006 or which has a memory of 8 GB or more", the base power (predicted value) of the device (desktop PC) satisfying the model condition is predicted to be 100 (W), the CPU minimum power is predicted to be 10 (W), and the CPU maximum power is predicted to be 100 (W). The power model definition file illustrated in FIG. 4 is an example. The power model definition file may include another power model, and a new power model may be created and added to the power model definition file. As illustrated in FIG. 4, if an element other than the CPU is different, the base power value varies even in the devices 100 (PCs) having the same CPU.

The sum of a CPU maximum power and a base power corresponds to a first device maximum power that is estimated to be consumed by the device 100 when the operation rate of the device 100 is maximum. The sum of a CPU minimum power and a base power corresponds to a first device minimum power (first device idle power) that is estimated to be consumed by the device 100 when the operation rate of the device 100 is minimum. That is, the first device minimum power is a power that is estimated to be consumed by the device 100 when the device 100 is in an idle state.

The arithmetic unit 24 is an example of an estimating unit, and estimates, on the basis of the configuration information on the device 100, a first device maximum power value representing the maximum power consumed by the device 100 and a first device minimum power value representing the minimum power consumed by the device 100. The first power calculator 18 calculates an instantaneous power consumed by the device 100 (instantaneous power consumption) on the basis of the operation information on the device 100 and the first device maximum power and first device minimum power of the device 100. Hereinafter, the power calculated by the first power calculator 18 is referred to as a "first power". The operation information acquiring unit 14 may store the first power calculated by the first power calculator 18 in the operation state history DB 16. For example, in a case where first powers of the individual devices 100 at individual times are calculated, the operation information acquiring unit 14 may store the values of the first powers of the individual devices 100 at the individual times in the operation state history DB 16.

The amount-of-power-usage calculator 26 performs time quadrature of first powers (instantaneous power consumptions), and thereby calculates the amount of power consumed by the device 100 (an integrated amount of power consumption).

Figure 5:
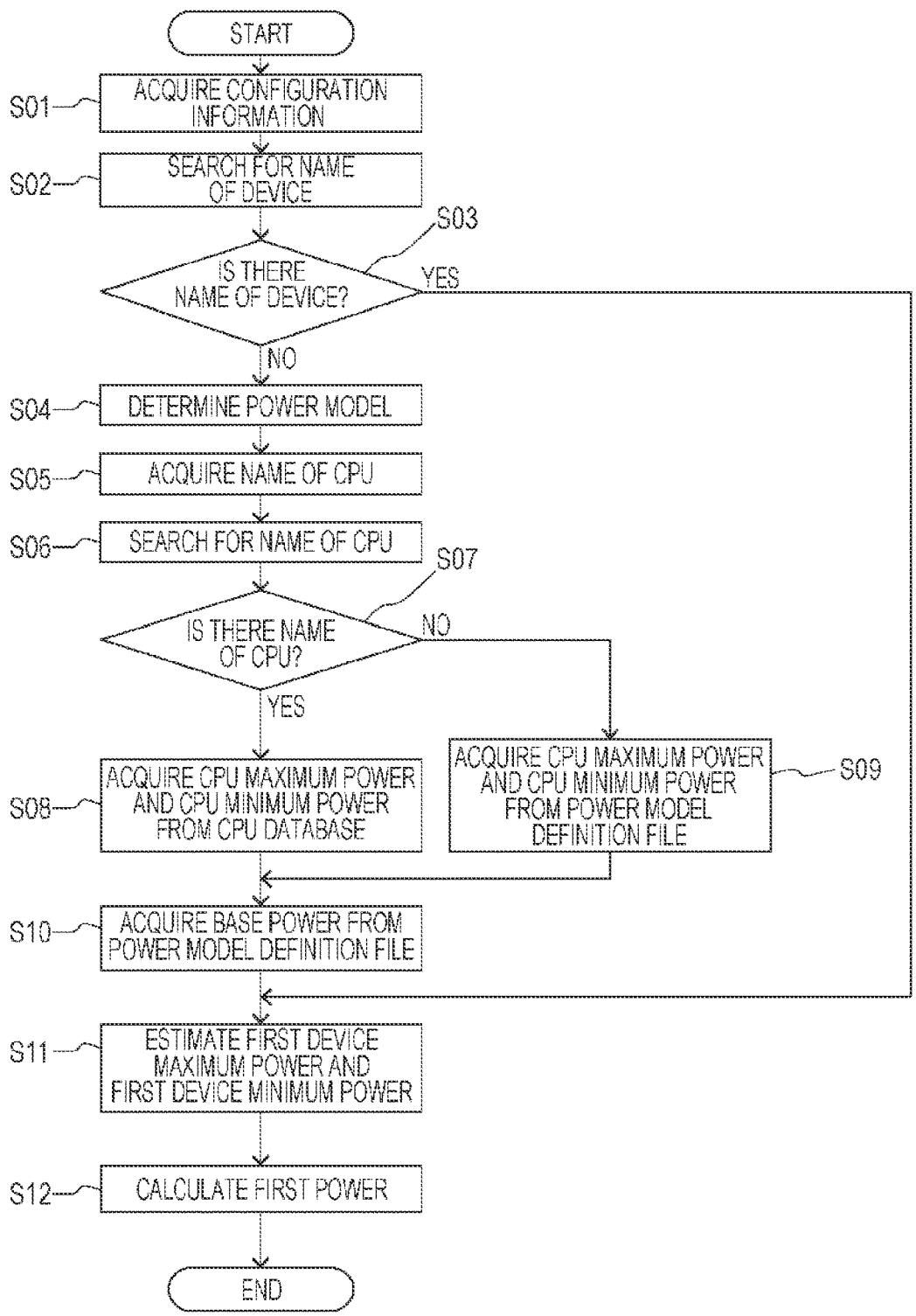
FIG. 5 is a flowchart illustrating an example of an operation performed by the information processing apparatus according to the first exemplary embodiment.

Next, a process mainly performed by the first power calculator 18 will be described with reference to the flowchart illustrated in FIG. 5. First, the device information acquiring unit 12 acquires configuration information on the device 100 serving as a target for which power consumption is to be calculated (step S01). At this time, the device information acquiring unit 12 may acquire the name of the device 100. Also, the operation information acquiring unit 14 acquires the operation information on the device 100 serving as the target from the device 100.

In a case where the name of the device 100 is acquired, the first power calculator 18 may estimate the first device maximum power and first device minimum power of the device 100 on the basis of the name. For example, the names, the first device maximum powers, and the first device minimum powers of the individual devices 100 may be stored in advance in a database (not illustrated) in association with one another. The first power calculator 18 searches the database for the name that has been acquired by the device information acquiring unit 12 (step S02). If the name exists in the database (YES in step S03), the first power calculator 18 acquires, from the database, the value of the first device maximum power and the value of the first device minimum power corresponding to the name (step S11). In this way, in a case where the name of the device 100 is identified, the first device maximum power and the first device minimum power may be estimated on the basis of the name. On the other hand, if the name does not exist in the database (NO in step S03), the first device maximum power and the first device minimum power are estimated through the process described below. Also, if the name of the device is not acquired by the device information acquiring unit 12, the first device maximum power and the first device minimum power are estimated through the process described below.

First, the arithmetic unit 24 refers to the power model definition file stored in the power model DB 22, and determines a power model that matches the configuration information on the device 100 (step S04). For example, in a case where the device 100 is a notebook PC and includes a display of 14 inches or less, the power model is determined to be "Note.Low" as illustrated in FIG. 4.

Subsequently, the arithmetic unit 24 acquires the name of the CPU from the configuration information on the device 100 (step S05), and searches the CPU DB 20 for the name of the CPU (step S06). If the name of the CPU exists in the CPU DB 20 (YES in step S07), the arithmetic unit 24 acquires a CPU maximum power and a CPU minimum power by using the CPU DB 20 (step S08). That is, the arithmetic unit 24 acquires, from the CPU DB 20, the values of the CPU maximum power and the CPU minimum power corresponding to the name of the CPU. On the other hand, if the name of the CPU does not exist in the CPU DB 20 (NO in step S07), the arithmetic unit 24 acquires a CPU maximum power and a CPU minimum power by using the power model definition file stored in the power model DB 22 (step S09). That is, the arithmetic unit 24 refers to the power model definition file, and acquires, from the power model definition file, the values of the CPU maximum power and the CPU minimum power defined by the power model determined in step S04.

Subsequently, the arithmetic unit 24 acquires the base power of the device 100 on the basis of the power model determined in step S04 (step S10). That is, the arithmetic unit 24 refers to the power model definition file, and acquires, from the power model definition file, the value of the base power defined by the power model determined in step S04.

Subsequently, the arithmetic unit 24 estimates the first device maximum power defined by the following equation (1) and the first device minimum power defined by the following equation (2) (step S11).

$$\text{First device maximum power} = \text{CPU maximum power} + \text{base power} \quad (1)$$

$$\text{First device minimum power} = \text{CPU minimum power} + \text{base power} \quad (2)$$

Figure 6:
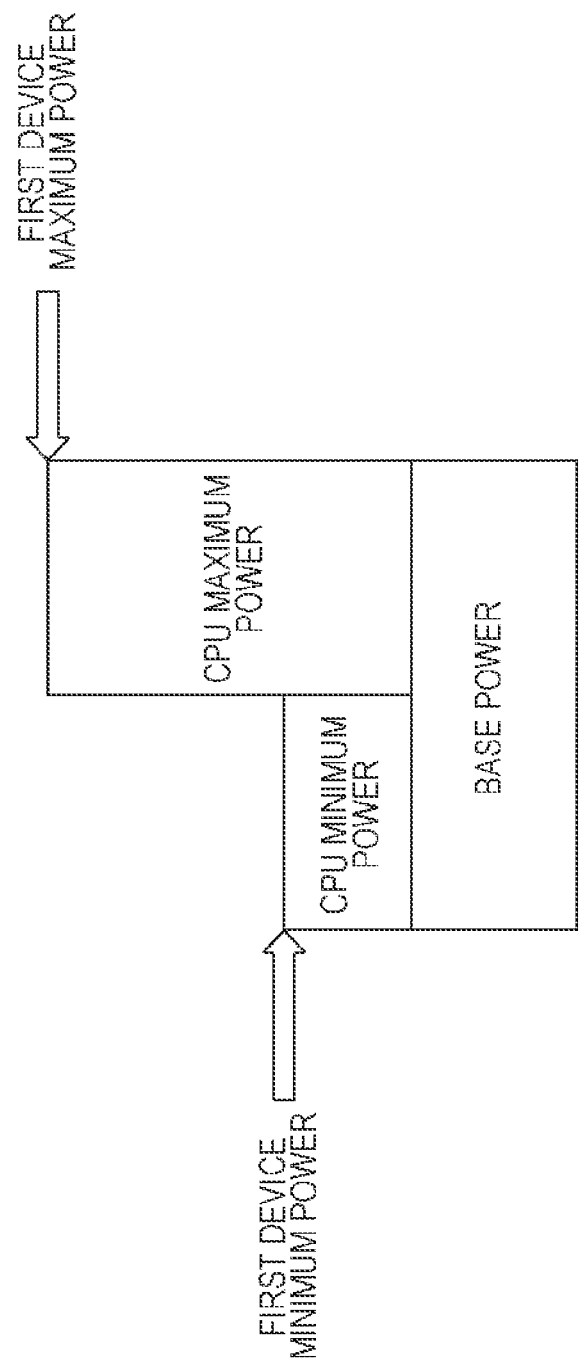
FIG. 6 is a diagram illustrating power consumption of a device.

A first device maximum power and a first device minimum power will be described with reference to FIG. 6. A base power corresponds to the power consumed by the device 100 without depending on the operation rate (usage rate of the CPU) of the device 100. The sum of the base power and a CPU maximum power corresponds to a first device maximum power. On the other hand, the sum of the base power and a CPU minimum power corresponds to a first device minimum power. In this way, by using a base power, a first device maximum power and a first device minimum power corresponding to the elements other than the CPU are estimated. For example, regarding the devices 100 (PCs) including the same CPU, if the elements other than the CPU (memory, HDD, display, etc.) are different, the power consumptions of the devices 100 may be different from each other. In this exemplary embodiment, a base power is specified on the basis of the power model definition file and the base power is used, so that a first device maximum power and a first device minimum power corresponding to the elements other than the CPU are estimated.

The first power calculator 18 calculates the first power (instantaneous power consumption) of the device 100 corresponding to an operation state, on the basis of the operation information on the device 100, and the first device maximum power and the first device minimum power of the device 100 (step S12).

The first power calculator 18 calculates the first power of the device 100 in accordance with, for example, the following equation (3).

$$\text{First power (W)} = \text{first device minimum power} + \text{operation rate of device} \times (\text{first device maximum power} - \text{first device minimum power}) \quad (3)$$

In a case where the device 100 is a PC, the first power calculator 18 calculates the first power of the device 100 in accordance with the following equation (4) by using the usage rate of the CPU as the operation rate of the device 100.

$$\text{First power (W)} = \text{first device minimum power} + \text{usage rate of CPU} \times (\text{first device maximum power} - \text{first device minimum power}) \quad (4)$$

Figure 7:
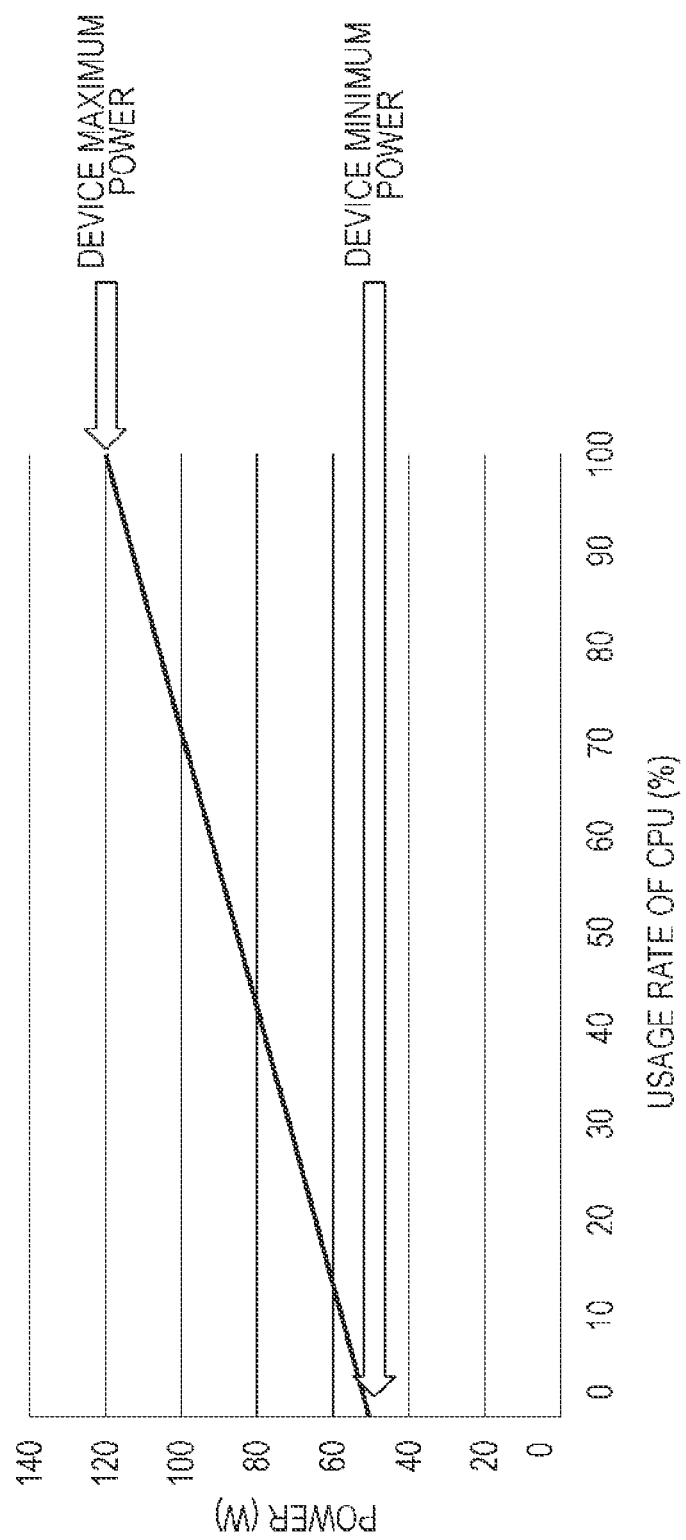
FIG. 7 is a graph illustrating a tendency of power consumption of a device.

FIG. 7 illustrates an example of a tendency of instantaneous power consumption of the device 100 corresponding to an operation state. Here, a description will be give of a case where the device 100 is a PC. The instantaneous power consumption of the PC depends on the operation rate of the PC, that is, the usage rate of the CPU, and increases as the usage rate of the CPU increases. Since there is a correlation between the usage rate of the CPU and the instantaneous power consumption of the device 100 (PC), the instantaneous power consumption of the device 100 (PC) corresponding to an operation state is calculated by estimating a first device maximum power, a first device minimum power, and an operation rate (usage rate).

The first power calculator 18 may calculate the first power corresponding to an operation state in real time. In this case, the operation information acquiring unit 14 acquires the operation information on the device 100 from the device 100 in real time, and outputs the operation information to the first power calculator 18. The first power calculator 18 calculates the first power of the device 100 in real time on the basis of the first device maximum power, the first device minimum power, and the operation information acquired in real time.

Subsequently, the first power calculator 18 outputs the value of the first power corresponding to the operation state to the amount-of-power-usage calculator 26. The amount-of-power-usage calculator 26 performs time quadrature of the first power, and thereby calculates the amount of power consumed by the device 100 (an integrated amount of power consumption).

The information processing apparatus 10 includes a processor, such as a CPU (not illustrated). The functions of the individual units of the information processing apparatus 10 are implemented when the processor executes a program.

Second Exemplary Embodiment

Figure 8:
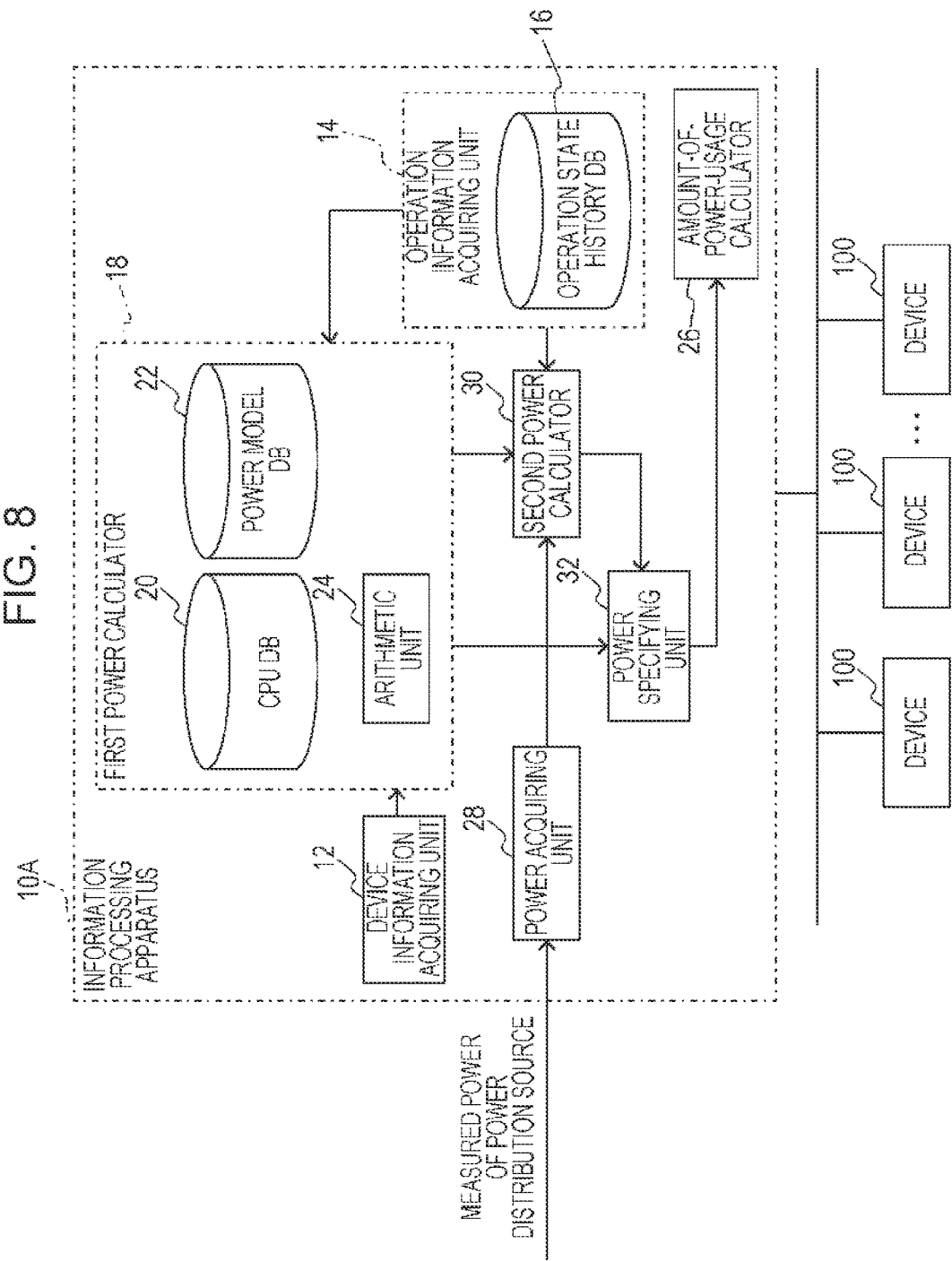
FIG. 8 is a block diagram illustrating an example of an information processing apparatus according to a second exemplary embodiment.

An information processing apparatus according to a second exemplary embodiment will be described with reference to FIG. 8. An information processing apparatus 10A according to the second exemplary embodiment includes a power acquiring unit 28, a second power calculator 30, and a power specifying unit 32, in addition to the elements of the information processing apparatus 10 according to the first exemplary embodiment. The configuration of the information processing apparatus 10A is the same as the configuration of the information processing apparatus 10 according to the first exemplary embodiment except that the power acquiring unit 28, the second power calculator 30, and the power specifying unit 32 are included. Thus, a description will be given below mainly of the power acquiring unit 28, the second power calculator 30, and the power specifying unit 32.

The power acquiring unit 28 acquires a value of a measured power of a power distribution source for plural devices 100. The measured power of the power distribution source corresponds to the overall power consumed in a site (system) in which the plural devices 100 are located. For example, the measured power of the power distribution source corresponds to the sum of instantaneous power consumptions of all the devices to which power is supplied from the power distribution source, or a measured power in an OA tap with a power measurement device to which the plural devices 100 are connected. The power of the power distribution source is measured by a measurement device (not illustrated), and the power acquiring unit 28 acquires the value of the measured power of the power distribution source from the measurement device.

The second power calculator 30 calculates instantaneous powers consumed by the individual devices 100 (instantaneous power consumptions) on the basis of history information including the values of measured powers of the power distribution source and the operation information on the individual devices 100. For example, the second power calculator 30 calculates the instantaneous power consumptions of the individual devices 100 on the basis of first powers, measured powers of the power distribution source for the plural devices 100, and the operation information on the individual devices 100. Hereinafter, the power calculated by the second power calculator 30 may be referred to as a "second power". The operation information acquiring unit 14 may store the second power calculated by the second power calculator 30 in the operation state history DB 16. For example, in a case where the second powers of the individual devices 100 at individual times are calculated, the operation information acquiring unit 14 may store the values of the second powers of the individual devices 100 at the individual times in the operation state history DB 16.

In a case where only a first power is to be acquired, the power specifying unit 32 outputs the value of the first power, which is regarded as power consumption of the device 100, to the amount-of-power-usage calculator 26. In a case where a second power is to be acquired, the power specifying unit 32 outputs the value of the second power, which is regarded as power consumption of the device 100, to the amount-of-power-usage calculator 26.

The amount-of-power-usage calculator 26 calculates the amount of power of the device 100 (an integrated amount of power consumption) by using the first power or second power output from the power specifying unit 32.

Next, a process mainly performed by the second power calculator 30 will be described with reference to the flowchart illustrated in FIG. 9. First, the second power calculator 30 acquires the value of the measured power of the power distribution source in a certain period from the power acquiring unit 28, acquires the operation information (power ON/OFF state and operation rate) of the individual devices 100 in the same period from the operation information acquiring unit 14, and acquires the values of the first powers of the individual devices 100 from the first power calculator 18 (step S20). As will be described below, in a case where a second power is calculated, the second power calculator 30 holds the value of the calculated second power. The second power calculator 30 may acquire real-time operation information on the individual devices 100 from the operation information acquiring unit 14, and may acquire the values of real-time first powers of the individual devices 100 from the first power calculator 18.

FIG. 10 illustrates an example of history information, that is, transitions of the measured power of the power distribution source, the operation states of the individual devices 100, and the powers of the individual devices 100. FIG. 10 illustrates, as an example, information on four devices 100 (devices A, B, C, and D) representing the power ON/OFF states, operation rates, first powers, and second powers at individual times. Also, FIG. 10 illustrates measured powers of the power distribution source at the individual times. Second powers are not acquired in the initial stage, and thus the second powers of the individual devices 100 are "unknown". However, the second powers of the individual devices 100 are sequentially acquired in the process described below.

Regarding an operation rate, the operation rate when the power consumption of the device 100 is maximum is 100%, and the operation rate when the power consumption of the device 100 is minimum (in an idle state) is 0%. In a case where the device 100 is a PC, the operation rate corresponds to the usage rate of the CPU. In a case where the device 100 is an image forming device such as a copier, the operation rate is 100% just after startup of the image forming device or during image formation such as copying, and the operation rate is 0% at other timings. An example of the operation rate is merely an example, and an exemplary embodiment of the present invention is not limited to this example. Hereinafter, a description will be given of the case of calculating the second powers of devices A, B, C, and D.

The second power calculator 30 specifies, for the device 100 for which a second power has not been calculated, the timing at which the operation state of only the device 100 changed largely (the timing at which an amount of change in the operation state exceeded a preset reference). That is, the second power calculator 30 specifies the timing at which an amount of change in the operation state of the device 100 for which a second power has not been calculated exceeded the preset reference and at which amounts of change in the operation states of the other devices 100 do not exceed the reference. For example, the second power calculator 30 specifies, for the device 100 for which a second power has not been calculated, the timing at which the power ON/OFF of only the device 100 is switched and at which the power ON/OFF of the other devices 100 is not switched and the operation rates thereof are not changed (step S21). For example, the second power of device A illustrated in FIG. 10 is not calculated, and the power is switched from OFF to ON at the time "9:30:30". During the period from the time "9:30:20" to "9:30:30", the power of devices B, C, and D is not switched, and also the operation rates of devices B, C, and D are not changed. Thus, the second power calculator 30 specifies the time "9:30:30" at which the power of only device A was switched.

If the timing is specified in step S21 (YES in step S22), the second power calculator 30 acquires, from the operation information acquiring unit 14, the operation information on device A after the time at which the power is switched (step S23). For example, the second power calculator 30 acquires the operation information about the period until when the operation rate of device A is determined to be constant. On the other hand, if the timing is not specified in step S21 (NO in step S22), the process ends.

Subsequently, the second power calculator 30 corrects the measured powers of the power distribution source at individual times after the time when the power of device A is switched, in accordance with the following equation (5) by using the first powers or second powers of devices B, C, and D other than device A (step S24).

$$\text{Corrected power of power distribution source} = (\text{measured power of power distribution source}) - (\text{sum of first powers or second powers of devices } B, C, \text{ and } D) \quad (5)$$

The second power calculator 30 corrects the measured powers of the power distribution source by using a first power for the device 100 for which a second power has not been calculated, and using a second power for the device 100 for which a second power has been calculated.

For example, a description will be given of the time "9:31:20" illustrated in FIG. 10. At this time, the measured power of the power distribution source is 44970 W, the second power of device B is 0 W, the first power of device C is 50 W (the second power has not been acquired), and the second power of device D is 40 W. Thus, the corrected power of the power distribution source is calculated in the following way.

$$\text{Corrected power of power distribution source} = 44970 - (0+50+40) = 44880 \text{ W}$$

In this way, the second power calculator 30 calculates the corrected powers of the power distribution source at individual times.

Subsequently, the second power calculator 30 determines whether or not there is a correlation between the operation rate of device A and the corrected power of the power distribution source (step S25). For example, in a case where the transition of the operation rate of device A and the transition of the corrected power of the power distribution source are substantially proportional to each other, it is determined that there is a correlation therebetween. That is, in a case where the corrected power of the power distribution source is changed in accordance with a change in device A, it is determined that the corrected power of the power distribution source is changed due to the operation state of device A, and thus it is determined that there is a correlation therebetween.

If there is a correlation between the operation rate of device A and the corrected power of the power distribution source (YES in step S25), the second power calculator 30 estimates the second device maximum power and second device minimum power of device A in accordance with the following equations (6) and (7) by using the corrected power of the power distribution source and the operation rate of device A (step S26).

$$\text{Second device maximum power} = (\text{corrected power of power distribution source when operation rate of device } A \text{ is } 100\%) - (\text{corrected power of power distribution source when power of device } A \text{ is OFF}) \quad (6)$$

$$\text{Second device minimum power} = (\text{corrected power of power distribution source when operation rate of device } A \text{ is } 0\%) - (\text{corrected power of power distribution source when power of device } A \text{ is OFF}) \quad (7)$$

On the other hand, if there is no correlation between the operation rate of device A and the corrected power of the power distribution source (NO in step S25), the process returns to step S21, and the second power calculator 30 performs step S21 and the subsequent steps.

After the second device maximum power and second device minimum power are estimated in step S26, the second power calculator 30 calculates the second power (instantaneous power consumption) of device A corresponding to an operation state on the basis of the operation information, the second device maximum power, and the second device minimum power of device A (step S27).

The second power calculator 30 calculates the second power of device A in accordance with, for example, the following equation (8).

$$\text{Second power (W)} = \text{second device minimum power} + \text{operation rate of device } A \times (\text{second device maximum power} - \text{second device minimum power}) \quad (8)$$

In a case where device A is a PC, the second power calculator 30 uses the usage rate of the CPU as the operation rate of device A, and calculates the second power of device A in accordance with the following equation (9).

$$\text{Second power (W)} = \text{second device minimum power} + \text{usage rate of CPU} \times (\text{second device maximum power} - \text{second device minimum power}) \quad (9)$$

The second power calculator 30 outputs the value of the second power corresponding to an operation state to the amount-of-power-usage calculator 26. The amount-of-power-usage calculator 26 performs time quadrature of second power and thereby calculates the amount of power consumed by device A (an integrated amount of power consumption).

Subsequently, the process returns to step S21, where the second power calculator 30 performs the same process as that described above on the device 100 for which a second power has not been calculated, and thereby calculates the second power of the device 100. Accordingly, the second power calculator 30 sequentially calculates the second powers of devices A, B, C, and D.

The second power calculator 30 may update the second powers of the individual devices 100 by performing step S21 and the subsequent steps. In this case, the second power calculator 30 specifies the device 100 whose power has been switched, calculates the corrected power of the power distribution source on the basis of the measured power of the power distribution source and the sum of the second powers of the other devices 100 in accordance with equation (5), and estimates a second device maximum power and a second device minimum power on the basis of the operation rate of the device 100 whose power has been switched and the corrected power of the power distribution source in accordance with equations (6) and (7). Also, the second power calculator 30 calculates a second power on the basis of the operation rate, the second device maximum power, and the second device minimum power of the device 100 whose power has been switched, in accordance with equation (8) or (9). In this way, the second power is updated, and thereby transitions of power consumptions of the individual devices 100 are continuously calculated.

In the second exemplary embodiment, a description has been given of the case of calculating a second power by using a first power calculated in the first exemplary embodiment. Alternatively, a second power may be calculated by using a first power that is calculated by using a method other than that according to the first exemplary embodiment. For example, power may be calculated by using the related art described in Japanese Unexamined Patent Application Publication No. 2012-138123 or Japanese Unexamined Patent Application Publication No. 2011-123762, and the calculated power may be used as a first power.

Next, another example of the second exemplary embodiment will be described with reference to FIG. 11. FIG. 11 illustrates another example of history information including measured powers of the power distribution source and the operation states (operation rates) of individual devices 100. FIG. 11 illustrates, as an example, the operation rates of three devices 100 (devices A, B, and C). The second power calculator 30 calculates the second power of the device 100 in which an amount of change in the operation state exceeds a preset reference, as in the above-described process. In the example illustrated in FIG. 11, an amount of change in the operation state of device A exceeds the preset reference, whereas the operation states of the other devices B and C are constant and amounts of change in the operation states do not exceed the preset reference. Thus, the second power calculator 30 calculates the second power of device A. Hereinafter, a process of calculating the second power of device A will be described.

The second power calculator 30 calculates the corrected power of the power distribution source when the operation rate of device A is 100%, the corrected power of the power distribution source when the operation rate of device A is 0%, and the corrected power of the power distribution source when the power of device A is OFF, in accordance with equation (5) given above. The individual corrected powers are as follows.

Corrected power when operation rate is 100%=330−200=130

Corrected power when operation rate is 0%=230−200=30

Corrected power when power is OFF=220−200=20

Subsequently, the second power calculator 30 estimates a second device maximum power in accordance with equation (6) given above, and estimates a second device minimum power in accordance with equation (7) given above. The second device maximum power and the second device minimum power are as follows.

Second device maximum power=130−20=110

Second device minimum power=30−20=10

Subsequently, the second power calculator 30 calculates the second powers of device A at individual operation rates in accordance with equation (8) given above. The second powers when the operation rates are 100%, 50%, and 0% (power ON state), respectively, are as follows.

When operation rate is 100%: $10+1\times(110-10)=110$

When operation rate is 50%: $10+0.5\times(110-10)=60$

When operation rate is 0% (power ON): $10+0\times(110-10)=10$

Note that the second power when the operation rate is 0% (power OFF) is 0.

As described above, the second power of device A in which an amount of change in the operation state exceeds a reference is calculated on the basis of an operation rate and measured power of the power distribution source. Also for the other devices B and C, the second powers thereof are calculated through a similar process.

In the above-described case where the second power of device A has been calculated, the second power may be preferentially used for the process of calculating the power of device A only in a case where the operation rate of device A is 100%, 50%, 0% (power ON) or 0% (power OFF), and the first power may be used in a case where the operation rate is another rate. That is, the second power may be preferentially used for an operation rate at which the second power is calculated, and the first power may be preferentially used for an operation rate at which the second power is not calculated.

Alternatively, a first power may be updated by using a second power. For example, a first device maximum power, a first device minimum power, and a base power may be updated by using a second device maximum power and a second device minimum power. The update may be performed by the second power calculator 30, or may be performed by the first power calculator 18 or the operation information acquiring unit 14.

The information processing apparatus 10A includes a processor, such as a CPU (not illustrated). The functions of the individual units of the information processing apparatus 10A are implemented when the processor executes a program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a configuration information acquiring unit configured to acquire configuration information representing a configuration of a device;
an operation information acquiring unit configured to acquire operation information representing an operation state of the device;
an estimating unit configured to estimate a first device maximum power and a first device minimum power in accordance with the configuration information, the first device maximum power being a maximum power consumed by the device, the first device minimum power being a minimum power consumed by the device; and
a first power calculator configured to calculate a first power consumed by the device, in accordance with the first device maximum power, the first device minimum power, and the operation information,
wherein the operation information is information representing a usage rate of a CPU included in the device, and wherein the first power calculator is further configured to calculate the first power in accordance with the first device maximum power, the first device minimum power, and the usage rate of the CPU.

2. The information processing apparatus according to claim 1, wherein
the operation information further comprises information representing an operation rate of the device, and
the first power calculator is further configured to calculate the first power by adding the first device minimum power to a value obtained by multiplying a difference between the first device maximum power and the first device minimum power by the operation rate.

3. The information processing apparatus according to claim 1, wherein the estimating unit is further configured to estimate the first device maximum power by adding a CPU maximum power and a base power, the CPU maximum power being a power consumed by the CPU when the usage rate of the CPU is maximum, the base power being a power consumed by elements of the device other than the CPU, and estimate the first device minimum power by adding a CPU minimum power and the base power, the CPU minimum power being a power consumed by the CPU when the usage rate of the CPU is minimum.

4. The information processing apparatus according to claim 3, wherein
the configuration information includes information representing a type of the CPU included in the device, and also includes, as information regarding the elements of the device other than the CPU, at least one of first information representing a type of the device, second information regarding a memory included in the device, third information regarding a display included in the device, and fourth information regarding an operating system mounted in the device, and
the estimating unit is further configured to acquire the CPU maximum power and the CPU minimum power of the CPU included in the device in accordance with information representing a correspondence among the type of the CPU, the CPU maximum power, and the CPU minimum power, and the information representing the type of the CPU included in the configuration information, and acquire the base power of the device in accordance with information representing a correspondence between the configuration of the device and the base power, and at least one of the first information, the second information, the third information, and the fourth information.

5. The information processing apparatus according to claim 1, further comprising:
a power acquiring unit configured to acquire a value of a measured power of a power distribution source, the measured power corresponding to an overall power consumption of a plurality of the devices; and
a second power calculator that, in a case where it is determined that a target device in which an amount of change in an operation state exceeds a preset reference exists among the plurality of the devices and that amounts of change in operation states of the devices other than the target device do not exceed the preset reference in accordance with history information including at least the value of the measured power of the power distribution source and pieces of operation information on the plurality of the devices, is configured to calculate a second power consumed by the target device in a specific operation state, in accordance with the history information.

6. The information processing apparatus according to claim 5, wherein, in a case where it is determined that a target device in which an amount of change in an operation state exceeds the preset reference exists among the plurality of the devices and that amounts of change in operation states of the devices other than the target device do not exceed the preset reference, the second power calculator is further configured to acquire a corrected power of the power distribution source by correcting the measured power of the power distribution source by using first powers of the other devices, estimate a second device maximum power and a second device minimum power in accordance with the operation information on the target device and the corrected power of the power distribution source, the second device maximum power being a maximum power consumed by the target device, the second device minimum power being a minimum power consumed by the target device, and calculate a second power of the target device in accordance with the operation information on the target device, the second device maximum power, and the second device minimum power.

7. The information processing apparatus according to claim 5, wherein, for any of the plurality of the devices for which the second power has been calculated, a power calculation process is performed by using the second power preferentially over the first power.

8. The information processing apparatus according to claim 5, wherein, for any of the plurality of the devices for which the second power has been calculated, the first power is updated by using the second power.

9. An information processing method comprising:
acquiring configuration information representing a configuration of a device;
acquiring operation information representing an operation state of the device;
estimating a first device maximum power and a first device minimum power in accordance with the configuration information, the first device maximum power being a maximum power consumed by the device, the first device minimum power being a minimum power consumed by the device; and
calculating a first power consumed by the device, in accordance with the first device maximum power, the first device minimum power, and the operation information,
wherein the operation information is information representing a usage rate of a CPU included in the device, and
wherein the calculating the first power consumed by the device comprises calculating the first power in accordance with the first device maximum power, the first device minimum power, and the usage rate of the CPU.

10. A non-transitory computer readable medium storing a program causing a computer to execute a process, the process comprising:
acquiring configuration information representing a configuration of a device;
acquiring operation information representing an operation state of the device;
estimating a first device maximum power and a first device minimum power in accordance with the configuration information, the first device maximum power being a maximum power consumed by the device, the first device minimum power being a minimum power consumed by the device; and calculating a first power consumed by the device, in accordance with the first device maximum power, the first device minimum power, and the operation information, wherein the operation information is information representing a usage rate of a CPU included in the device, and wherein the calculating the first power consumed by the device comprises calculating the first power in accordance with the first device maximum power, the first device minimum power, and the usage rate of the CPU.

11. The information processing apparatus according to claim 1, wherein the configuration information representing the configuration of the device comprises information on a CPU included in the device, and wherein the first power calculator is further configured to calculate the first power consumed by the device based on a power used by the CPU included in the device according to the configuration information and a base power consumed by elements of the device other than the CPU determined based on the configuration information.

* * * * *